(12) United States Patent
Lee et al.

(10) Patent No.: US 11,832,752 B2
(45) Date of Patent: Dec. 5, 2023

(54) HEATING APPARATUS AND COOKING APPARATUS INCLUDING SAME

(71) Applicant: LG ELECTRONICS INC., Seoul (KR)

(72) Inventors: Jeonghyun Lee, Seoul (KR); Sungho Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 598 days.

(21) Appl. No.: 16/639,354

(22) PCT Filed: Jul. 23, 2018

(86) PCT No.: PCT/KR2018/008308
§ 371 (c)(1),
(2) Date: Feb. 14, 2020

(87) PCT Pub. No.: WO2019/035570
PCT Pub. Date: Feb. 21, 2019

(65) Prior Publication Data
US 2020/0245804 A1    Aug. 6, 2020

(30) Foreign Application Priority Data

Aug. 16, 2017    (KR) .......................... 10-2017-0103733

(51) Int. Cl.
*A47J 27/10*    (2006.01)
*A47J 27/00*    (2006.01)
(Continued)

(52) U.S. Cl.
CPC ............. *A47J 27/10* (2013.01); *A47J 27/002* (2013.01); *F24C 7/067* (2013.01); *F24C 7/083* (2013.01);
(Continued)

(58) Field of Classification Search
CPC ......... A23L 5/17; B29C 65/38; B29C 65/743; B29C 66/1122; B29C 66/43121;
(Continued)

(56) References Cited

U.S. PATENT DOCUMENTS 2,590,942 A * 4/1952 Cornelius ................. F24C 7/04
99/347
5,567,458 A * 10/1996 Wu ........................ A47J 27/004
426/523
(Continued)

FOREIGN PATENT DOCUMENTS

CN  102389257   3/2012
CN  204318389   5/2015
(Continued)

OTHER PUBLICATIONS

European Office Action issued in Application No. 18 8847 043.9 dated Feb. 4, 2022.
(Continued)

*Primary Examiner* — Nathaniel E Wiehe
*Assistant Examiner* — Frederick F Calvetti
(74) *Attorney, Agent, or Firm* — KED & ASSOCIATES

(57) ABSTRACT

A heating apparatus and a cooking apparatus including the same are disclosed. The disclosed invention comprises: a housing having an accommodation space formed therein and an opened upper part; a container, which is inserted into the accommodation space inside the housing, and has an opened upper part and a space formed therein for accommodating fluid; a heating part for heating the fluid accommodated inside the container; and a cover for covering the opened upper part of the housing, wherein the cover includes a cover main body part, which is provided to have a length extending in the longitudinal direction and a width extending in the horizontal direction, is provided at the housing so as to be
(Continued)

rotatable between an opening position at which the opened upper part of the housing is opened and a closing position at which the opened upper part of the housing is closed, and covers the opened upper part of the container at the closing position so as to seal the container.

11 Claims, 9 Drawing Sheets

(51) Int. Cl.
  *F24C 7/06* (2006.01)
  *F24C 7/08* (2006.01)
  *F24C 15/10* (2006.01)
  *F24C 15/12* (2006.01)
(52) U.S. Cl.
  CPC ............ *F24C 7/085* (2013.01); *F24C 15/102* (2013.01); *F24C 15/12* (2013.01)
(58) Field of Classification Search
  CPC .......... B29C 66/82421; B29C 66/8324; B29C 66/849; B65B 25/22; B65B 29/08; B65B 31/024; F24C 15/10; F24C 15/18
  USPC ...................................................... 126/377.1
  See application file for complete search history.

(56) References Cited

U.S. PATENT DOCUMENTS

| | | | |
|---|---|---|---|
| 9,839,230 | B2 | 12/2017 | Neff et al. |
| 11,019,953 | B2* | 6/2021 | Lee .......... A47J 36/16 |
| 11,051,647 | B2* | 7/2021 | Lee .......... A47J 27/10 |
| 2012/0111312 | A1 | 5/2012 | Kim |
| 2015/0040516 | A1* | 2/2015 | Torre ....... B65B 29/08 53/167 |
| 2018/0184488 | A1* | 6/2018 | Lee ......... B65B 51/148 |
| 2019/0170364 | A1* | 6/2019 | Ha ........... F24C 7/086 |
| 2020/0245804 | A1* | 8/2020 | Lee ......... F24C 15/102 |

FOREIGN PATENT DOCUMENTS

| | | | |
|---|---|---|---|
| CN | 204635968 | | 9/2015 |
| CN | 205053729 | | 3/2016 |
| CN | 206227510 | | 6/2017 |
| EP | 1 444 938 | | 8/2004 |
| EP | 1444938 | * | 11/2004 |
| EP | 2 436 289 | | 4/2012 |
| EP | 2436289 | * | 4/2012 |
| EP | 2 558 787 | | 2/2013 |
| EP | 2 755 532 | | 7/2014 |
| EP | 2755532 | * | 7/2014 |
| EP | 2 777 451 | | 9/2014 |
| EP | 2777451 | * | 9/2014 |
| JP | 3599664 | * | 12/1998 |
| JP | 2002-159397 | | 6/2002 |
| JP | 3599664 | | 12/2004 |
| KR | 20 0133930 | * | 12/1998 |
| KR | 20-0133930 | | 12/1998 |
| KR | 10-2010-0120018 | | 11/2010 |
| KR | 10 2010 0120018 | * | 11/2010 |
| KR | 10-2017-0003237 | | 1/2017 |
| KR | 20170003237 | * | 1/2017 |
| WO | WO 2011/128839 | | 10/2011 |
| WO | WO 2011128839 | * | 10/2011 |
| WO | WO 2013/124872 | | 8/2013 |
| WO | WO 2013124872 | * | 8/2013 |

OTHER PUBLICATIONS

European Search Report issued in Application No. 18847043.9 dated Apr. 16, 2021.
Chinese Office Action issued in Application No. 201880052561.2 dated Apr. 25, 2021.
International Search Report (with English Translation) dated Nov. 20, 2018 issued in Application No. PCT/KR2018/008308.
Written Opinion dated Nov. 20, 2018 issued in Application No. PCT/KR2018/008308.
Chinese Office Action issued in Application No. 201880052561.2 dated Jun. 8, 2022.
European Search Report issued in Application No. 18 847 043.9 dated Jul. 21, 2022.

* cited by examiner

HEATING APPARATUS AND COOKING APPARATUS INCLUDING SAME

CROSS-REFERENCE TO RELATED PATENT APPLICATIONS

This application is a U.S. National Stage Application under 35 U.S.C. § 371 of PCT Application No. PCT/KR2018/008308, filed Jul. 23, 2018, which claims priority to Korean Patent Application No. 10-2017-0103733, filed Aug. 16, 2017, whose entire disclosures are hereby incorporated by reference.

TECHNICAL FIELD

The present invention relates to a heating apparatus and a cooking apparatus including the same, and more particularly, to a heating apparatus for performing cooking such as sous-vide cooking and a cooking apparatus including the same.

BACKGROUND ART

Cooking apparatuses are one of household appliances for cooking food, and are installed in a kitchen space to cook food according to a user's intention. Such cooking apparatuses may be classified in various ways according to heat sources used therein, forms thereof, and types of fuel.

When classified according to the forms in which food is cooked, cooking apparatuses may be classified as an open type and a closed type according to the form of space in which food is placed. Closed type cooking apparatuses include an oven, a microwave, etc., and open type cooking apparatuses include a cooktop, a hob, etc.

The closed type cooking apparatuses are cooking apparatuses in which a space in which food is placed is sealed, and the sealed space is heated to cook food. The open type cooking apparatuses are cooking apparatuses in which food or a container filled with food is placed in an open space, and the food or the food container is heated to cook food.

A cooking compartment, which is a space being sealed when food placed therein is attempted to be cooked, is provided in the closed type cooking apparatuses. Such a cooking compartment is a space in which food is substantially cooked. A heat source is provided in a space inside or outside the cooking compartment to heat the cooking compartment.

Recently, complex cooking apparatuses have been proposed in which a closed type cooking apparatus and an open type cooking apparatus are simultaneously installed and a plurality of heat sources are combined so that various foods may be cooked and a plurality of foods may be simultaneously cooked. The cooking apparatus in which a plurality of heat sources are installed is accompanied by a flow path of cooling air for cooling the plurality of heat sources and electrical components.

In the complex cooking apparatus, the open type cooking apparatus is disposed above the closed type cooking apparatus. Also, in the open type cooking apparatus, a plurality of heaters or burners are installed to allow a plurality of dishes to be cooked simultaneously.

That is, a user cooks using the closed type cooking apparatus when barbecuing, baking, or roasting meat or fish and cooks using the open type cooking apparatus exposed at the top when cooking, in a usually way, by heating a container filled with food.

Meanwhile, in recent years, cases in which various recipes other than commonly known recipes such as oven baking, roasting, and steaming using the open type cooking apparatus or the closed type cooking apparatus are newly developed or unique recipes used only by some people gradually spread to the public have increased. Sous-vide recipes are one kind of recipes gradually spreading to the public.

Sous-vide cooking is a low-temperature vacuum recipe for keeping nutrients, textures, and tastes of ingredients at optimal conditions. Sous-vide cooking is a food preservation method first devised in the form of using air by Benjamin Thomson (Count Rumford) in 1799 and brought to the fore by American and French engineers in the 1960s. Sous-vide cooking is a recipe developed by Bruno Goussault after being used in cooking Foie gras by George Pralus in 1974. The French term "sous-vide" indicates a vacuum low-temperature recipe and is also referred to as "under vacuum" in English. Sous-vide cooking has been used in some high-class restaurants in Europe since 1970. Then, in recent years, sous-vide cooking has been introduced in South Korea and used for high-end menus in restaurants, hotels, or the like.

Generally, sous-vide recipes are cooking methods in which food in a sealed plastic bag is heated for a long time in low-temperature water which is kept at about 50 to 60° C. The sous-vide recipes have advantages in that, by keeping the original tastes of ingredients, textures, aromas, and nutrients of the ingredients are kept at optimal conditions. Particularly, the textures of the ingredients are kept well. Meats may become tough due to protein modification when cooked at high temperatures. The sous-vide recipes can prevent this and keep the meats soft and moist. Also, the sous-vide recipes have a characteristic in that the inside and outside of food are heated evenly.

In cooking using the sous-vide recipes, it is very important not only to ensure that food to be cooked is tightly sealed by being packed in a vacuum state, but also to keep temperature of water for cooking the food constant for a long time.

However, because sous-vide cooking takes a long time for cooking (typically, from about 4 hours up to 48 hours) and it is difficult to control the cooking temperature and cooking time for sous-vide cooking, a separate cooking apparatus dedicated for sous-vide cooking is required for effective sous-vide cooking.

The most important ability that the separate cooking apparatus dedicated for sous-vide cooking should have is the ability to stably keep a cooking temperature set for sous-vide cooking for a long time. Taking into consideration that a heat source is used for a long time due to the characteristics of the cooking apparatus, the ability to increase the operating efficiency of the heat source is also an important ability that the cooking apparatus should have.

Keeping the cooking temperature and improving the efficiency of the heat source are both related to the insulation performance of the cooking apparatus. When the insulation performance of the cooking apparatus is not high such that the outside heat or cold enters the cooking apparatus and affects the cooking temperature, it is difficult for the cooking apparatus to stably keep the cooking temperature in the set temperature range. Also, when the insulation performance of the cooking apparatus is not high such that the amount of heat leaking to the outside of the cooking apparatus increases, it is very difficult to improve the efficiency of the heat source.

DISCLOSURE

Technical Problem

The present invention is directed to providing a heating apparatus capable of providing improved insulation performance and convenience in use and a cooking apparatus including the same.

Technical Solution

One aspect of the present invention provides a heating apparatus including: a housing having an accommodation space formed therein and an open upper part; a container which is inserted into the accommodation space inside the housing and has an open upper part and a space formed therein for accommodating a fluid; a heating part configured to heat the fluid accommodated inside the container; and a cover configured to cover the open upper part of the housing, wherein the cover includes a cover main body part, which is provided to have a length extending in the longitudinal direction and a width extending in the horizontal direction, is provided at the housing so as to be rotatable between an opening position at which the open upper part of the housing is opened and a closing position at which the open upper part of the housing is closed, and covers the open upper part of the container and seals the container at the closing position, and a guide protrusion part, which is provided to protrude from the cover main body part, is inserted into the container at the closing position, and, at the opening position, has at least a portion protruding by a length that allows it to be located in a region of the upper part of the container.

The cover may further include a hinge part configured to couple a rear side of the cover main body part to a rear side of the housing so as to be rotatable in a vertical direction, and the guide protrusion part may be disposed at the rear side of the cover main body part adjacent to the hinge part.

The guide protrusion part may include a first guide surface protruding from the cover main body part so as to have a length extending in a thickness direction of the cover main body part and a width extending in a width direction of the cover main body part.

The first guide surface may form a plane extending from the cover main body part so as to be parallel to a rear side surface of the container at the closing position, form a plane extending from the cover main body part so as to be parallel to a bottom surface of the container at the opening position, and form a plane inclined downward toward the container from the cover main body part between the closing position and the opening position.

The guide protrusion part may include a second guide surface connected to both side end portions of the first guide surface in a width direction thereof, and the second guide surface may protrude from the cover main body part so as to have a length extending in the thickness direction of the cover main body part and a width extending in a longitudinal direction of the cover main body part.

The cover main body part may include a cover frame forming a shell of the cover, an outer side cover part coupled to the cover frame, and an inner side cover part coupled to the cover frame so as to be disposed below the outer side cover part at the closing position and formed so that the guide protrusion part protrudes therefrom.

The guide protrusion part may be formed to protrude in a thickness direction of the inner side cover part from an edge portion of the inner side cover part.

The guide protrusion part may be formed to protrude in a form surrounding an edge of the inner side cover part adjacent to the rear side of the cover main body part.

The outer side cover part may be formed in the shape of a flat plate, and a sealing space surrounded by the outer side cover part and the inner side cover part may be formed between the outer side cover part and the inner side cover part.

The inner side cover part may include a planar part which forms a plane parallel to the outer side cover part and is disposed to be spaced a predetermined distance apart from the outer side cover part so that the sealing space is formed between the outer side cover part and the planar part, a sidewall part which extends toward the outer side cover part from an edge of the planar part and forms a sidewall surrounding the sealing space from a side portion thereof, and an extension part which forms a plane extending from the sidewall part in an outward direction parallel to the outer side cover part and comes in close contact with the outer side cover part.

The cover frame may include a frame main body part forming a shell of the cover frame, a first seating surface which is concavely formed in the frame main body part and forms a concave plane so that the outer side cover part is seated thereon, a through-part which is formed to pass through an inner side of the first seating surface and forms a path through which the planar part and the sidewall part are able to pass, and a second seating surface which is disposed between the first seating surface and the through-part, is concavely formed in the frame main body part so that a step is formed between the first seating surface and the second seating surface, and forms a concave plane so that the extension part is seated thereon.

The cover may further include a first sealing member configured to seal between the outer side cover part and the extension part and between the outer side cover part and the first seating surface and a second sealing member configured to seal between the second seating surface and the extension part.

The container may include an upper end bending part which protrudes in an outward direction parallel to the frame main body part from an upper end of the container, and the cover may further include a third sealing member which is provided to protrude from an inner side surface of the frame main body part facing the upper end bending part and comes in close contact with the upper end bending part at the closing position to seal between the frame main body part and the upper end bending part.

The cover may further include a protruding bar which is disposed at a front side of the cover main body part, is provided to protrude from an inner side surface of the frame main body part facing the housing, and comes in close contact with the housing at the closing position to form a blocking wall at a front portion of the container.

The cover may further include a magnetic member which is provided inside the protruding bar and provides a magnetic force that causes the protruding bar to come in close contact with the housing.

Another aspect of the present invention provides a cooking apparatus including: a cooktop case; and a heating apparatus provided inside or outside the cooktop case, wherein the heating apparatus includes a housing having an accommodation space formed therein and an open upper part, a container which is inserted into the accommodation space inside the housing and has an open upper part and a space formed therein for accommodating a fluid, a heating part configured to heat the fluid accommodated inside the container, and a cover configured to cover the open upper part of the housing, wherein the cover includes a cover main body part, which is provided to have a length extending in the longitudinal direction and a width extending in the horizontal direction, is provided at the housing so as to be rotatable between an opening position at which the open upper part of the housing is opened and a closing position at which the open upper part of the housing is closed, and covers the open upper part of the container and seals the container at the closing position, and a guide protrusion part, which is provided to protrude from the cover main body part, is inserted into the container at the closing position, and, at the opening position, has at least a portion protruding by a length that allows it to be located in a region of the upper part of the container.

The cooking apparatus may further include a cooktop heating part provided at the cooktop case, and the heating apparatus may be disposed in the vicinity of the cooktop heating part.

An upper plate may be provided at an upper portion of the cooktop case, and, when the cover is at the closing position, the cover may form the same plane as the upper plate.

The cover may further include a hinge part, which is configured to couple a rear side of the cover to a rear side of the housing so as to be rotatable in a vertical direction and configured to support the rear side of the cover, and a protruding bar, which is configured to protrude from a front side of the cover and support the front side of the cover at the closing position, wherein the protruding bar may protrude to a height that allows the protruding bar to support the cover so that the cover remains level at the closing position.

The protruding bar may be disposed at a position spaced a predetermined distance apart rearward from a front edge of the cover, and an insertion space surrounded in a U-shape open leftward by the cover, the protruding bar, and the housing may be formed at a front side of the protruding bar.

Advantageous Effects

According to a heating apparatus and a cooking apparatus including the same according to the present invention, a sealing space for forming an insulating air layer is formed inside a cover and insulation performance of the cover is improved. In this way, it is possible to prevent an occurrence of an accident in which a user gets burned due to an excessive rise of a surface temperature of the cover.

In addition, according to the present invention, each coupling portion surrounding the sealing space is sealed by a double sealing structure. In this way, it is possible not only to provide a cover whose insulation performance is effectively improved, but also to effectively suppress an occurrence of a phenomenon in which a see-through window is covered by dew formed inside the cover.

In addition, according to the present invention, airtight performance can be effectively improved between the cover and a container by a double blocking structure which is formed by combining an inner side protruding structure of the container, which is formed by a guide protrusion part forming a sidewall structure inside the container, and a sealing structure, which is formed between the cover and the container by a sealing member. In this way, it is possible to effectively prevent external leakage of water vapor generated inside the container and to guide a position where the water vapor is formed on the cover to be inside a region of the guide protrusion part so that surroundings of the cooking apparatus are prevented from being polluted by condensed water when the cover is opened.

In addition, according to the present invention, a configuration that guides a flow of condensed water so that the condensed water formed on an inner side surface of the cover flows back into the container instead of flowing to the outside of the apparatus is provided at the inner side surface of the cover. In this way, it is possible to provide improved convenience in use by preventing surroundings of the heating apparatus from being polluted or soaked with water, keeping the cooking apparatus and surroundings thereof clean, and the like.

In addition, according to the present invention, a protruding bar is added in front of the cover. In this way, it is possible to provide various functions and effects such as a function of shielding external heat, a function of keeping the cover level, improving the appearance of the cover by forming a hidden handle, improving airtight performance, and the like.

MODES OF THE INVENTION

Figure 1:
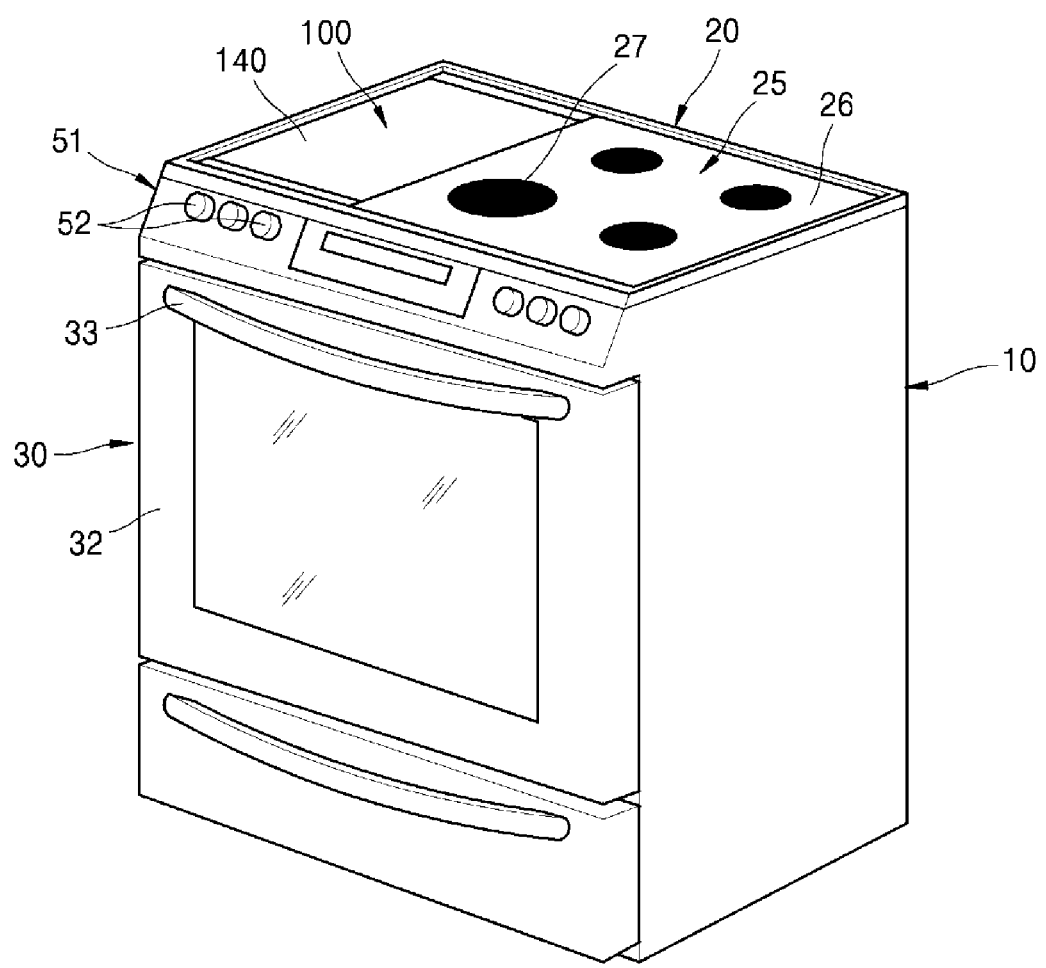
FIG. 1 is a perspective view schematically illustrating a cooking apparatus according to an embodiment of the present invention.

Hereinafter, exemplary embodiments of a heating apparatus and a cooking apparatus including the same according to the present invention will be described with reference to the accompanying drawings. The thicknesses of lines, the sizes of elements, or the like illustrated in the drawings may have been exaggerated for clarity and convenience of description. Also, terms used herein are those defined in consideration of functions in the present invention, and the terms may be changed according to an intention or practice of a user or an operator. Therefore, such terms should be defined on the basis of the content throughout the present specification.

Overall Structure of Cooking Apparatus

Figure 2:
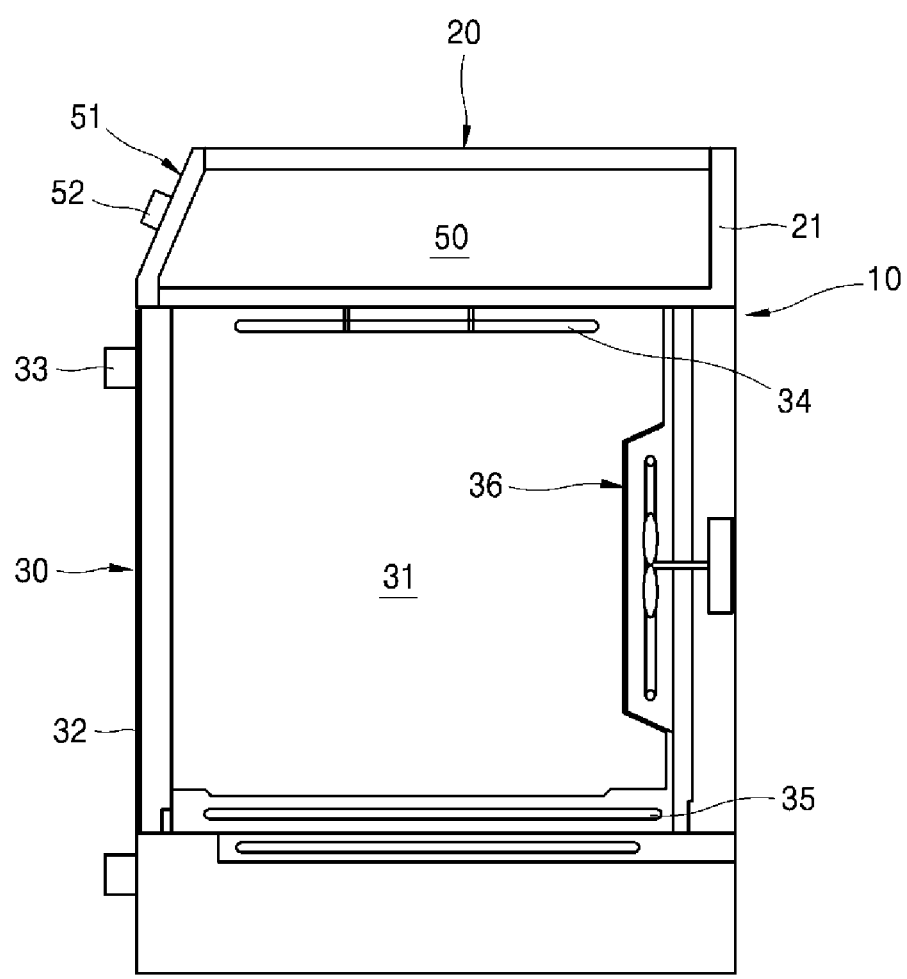
FIG. 2 is a side cross-sectional view showing an internal configuration of the cooking apparatus according to an embodiment of the present invention.

FIG. 1 is a perspective view schematically illustrating a cooking apparatus according to an embodiment of the present invention, and FIG. 2 is a side cross-sectional view showing an internal configuration of the cooking apparatus according to an embodiment of the present invention.

Referring to FIGS. 1 and 2, an exterior of the cooking apparatus according to an embodiment of the present invention is formed by a main body 10. The main body 10 may be provided in the form including a substantially rectangular parallelepiped shape and is formed of a material having a predetermined strength to protect a plurality of components provided in an inner space thereof.

An open space, i.e., a cooktop part 20 provided to heat food or a container filled with food placed thereon to cook food, is disposed at an upper end portion of the main body 10.

The cooktop part 20 includes a cooktop case 21, a high-temperature cooking unit 25, and a low-temperature heating apparatus 100. The cooktop part 20 is provided to be able to perform cooking by the high-temperature cooking unit 25 and low-temperature cooking, such as sous-vide cooking, by the low-temperature heating apparatus 100 together. A specific configuration of the cooktop part 20 will be described below.

An oven part 30 is provided below the cooktop part 20. A cooking compartment 31 which provides a space in which food is cooked is disposed in an inner space of the oven part 30.

The cooking compartment 31 is formed in a rectangular parallelepiped shape with an open front surface. In a state in which the cooking compartment 31 is sealed, an inner space of the cooking compartment 31 is heated to cook food. That is, in the oven part 30, the inner space of the cooking compartment 31 is substantially a space where food is cooked.

An upper heater 34 configured to heat the inner space of the cooking compartment 31 from above may be provided at an upper side of the cooking compartment 31, and a lower heater 35 configured to heat the inner space of the cooking compartment 31 from below may be provided at a lower side of the cooking compartment 31.

Also, a convection part 36 configured to cause hot air to be convected and heat the inner space of the cooking compartment 31 may be provided at a rear side of the cooking compartment 31.

The convection part 36 forcibly causes flow of air in the inner space of the cooking compartment 31. That is, the convection part 36 sucks and heats the air in the inner space of the cooking compartment 31 and then causes the air to flow while discharging the air back into the inner space of the cooking compartment 31, thereby causing the inner space of the cooking compartment 31 to be heated. In this way, the convection part 36 allows food placed in the inner space of the cooking compartment 31 to be heated evenly.

A door 32 configured to selectively open or close the cooking compartment 31 is rotatably provided in the oven part 30.

The door 32 is formed in a rectangular parallelepiped shape having a predetermined thickness as a whole. A handle 33 is provided at a front surface of the door 32 so as to be gripped by a user when the user attempts to rotate the door 32. The user may easily rotate the door 32 by the handle 33.

A control panel 51 is provided at a front surface of the cooktop part 20, i.e., an upper side of the door 32. The control panel 51 may be formed in a rectangular parallelepiped shape having a predetermined inner space, and an input part 52 through which the user inputs a manipulation signal for operating the cooktop part 20 and the oven part 30 is provided at a front surface of the control panel 51.

A plurality of manipulation switches are provided at the input part 52, and the user may directly input a manipulation signal through the plurality of manipulation switches.

Also, a display part configured to provide operation information of the cooking apparatus, cooking information of food, or the like may be further provided at the control panel 51. The user may check various pieces of information on the cooking apparatus through the display unit.

An electrical components compartment 50 configured to provide a space in which electrical components are disposed is formed in an inner space of the main body 10, i.e., a space between the cooktop part 20 and the oven part 30. The control panel 51 is disposed at a front surface of the electrical components compartment 50, and a structure in which the control panel 51 seals the front surface of the electrical components compartment 50 is formed substantially.

Configuration of Cooktop Part

Figure 3:
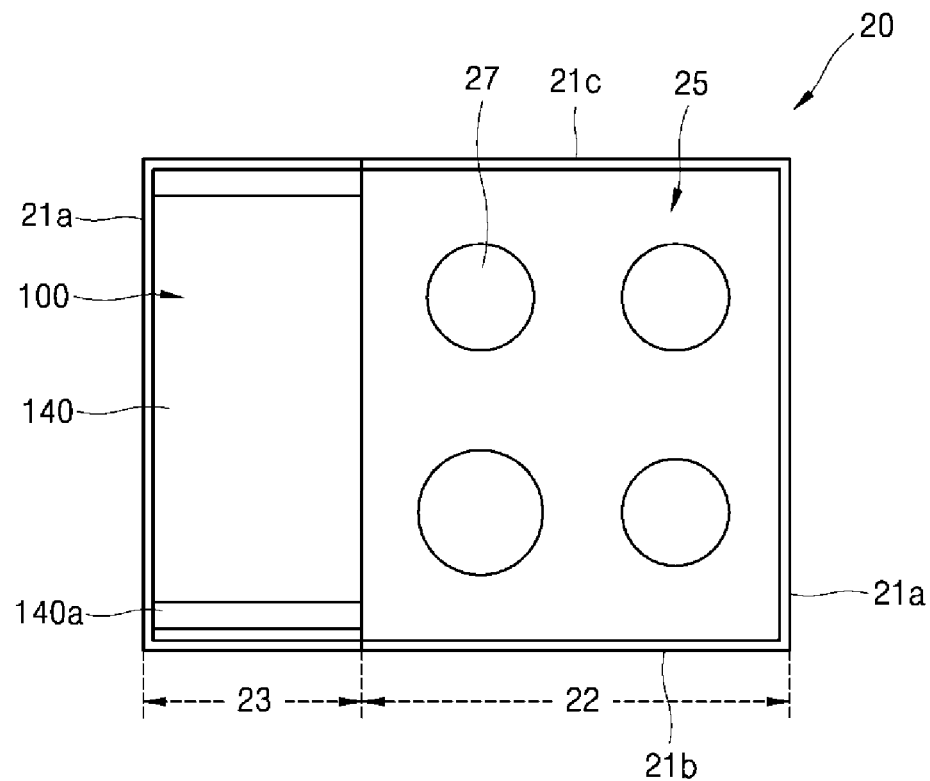
FIG. 3 is a plan view schematically showing a configuration of a cooktop part of the cooking apparatus according to an embodiment of the present invention.

FIG. 3 is a plan view schematically showing a configuration of a cooktop part of the cooking apparatus according to an embodiment of the present invention. Here, note that FIG. 3 is a view schematically illustrating the cooktop part in a state in which an upper plate is removed.

Referring to FIGS. 1 to 3, the cooktop part 20 includes the cooktop case 21, the high-temperature cooking unit 25, and the low-temperature heating apparatus 100.

The cooktop case 21 forms the exterior of the cooktop part 20 according to the present embodiment, and an inner space with an open upper part is formed inside the cooktop case 21. The inner space of the cooktop case 21 is divided into a first region 22 and a second region 23. The first region 22 corresponds to a space in which the high-temperature cooking unit 25 is provided in the cooktop case 21, and the second region 23 corresponds to a space in which the low-temperature heating apparatus 100 is provided in the cooktop case 21. In the present embodiment, the first region 22 and the second region 23 are disposed to be adjacent to each other in the horizontal direction and are separated from each other by a barrier 28 configured to divide the inner space of the cooktop case 21.

The high-temperature cooking unit 25 is provided in the cooktop case 21. The high-temperature cooking unit 25 is accommodated in the cooktop case 21 so as to be disposed in the first region 22. The high-temperature cooking unit 25 may include an upper plate 26 and cooktop heating parts 27.

The upper plate 26 is provided at an upper portion of the cooktop case 21, more specifically, at an upper portion of the first region 22, so as to form an exterior of an upper surface of the high-temperature cooking unit 25 and provide a surface on which a container and food for cooking may be placed. The upper plate 26 may be formed of ceramic glass and formed in the shape of a rectangular flat plate having a predetermined thickness.

A manipulation portion display may be provided at a front portion of the upper plate 26 so as to identify a manipulation portion of a manipulation unit (not illustrated) provided in the cooktop case 21 to manipulate operation of the cooktop heating parts 27 which will be described below. The manipulation portion display may be printed on an upper surface of the upper plate 26, attached thereto in the shape of a film, or formed by a ceramic glass portion corresponding thereto being transparent or translucent to expose the manipulation unit. Also, the manipulation portion display may be formed so as not to be visible from the outside before manipulation and visible when the user touches the vicinity thereof and causes a backlight at a lower surface of the ceramic glass to be turned on. In addition, a lower surface of the manipulation portion display at the upper plate 26 may come in close contact with an upper surface of the manipulation unit.

Also, when the upper plate 26 is fixed to an upper portion of the cooktop case 21, at positions on the upper plate 26 corresponding to the cooktop heating parts 27, markings indicating that the corresponding positions are positions of heating parts may be provided. Also, the markings may be provided to distinguish whether each heating part is a heating part for a burner, a heating part for an inverter, a heating part for a hot plate, or the like.

A connecting bracket (not illustrated) which is in the form corresponding to a side surface part 21*a*, a front surface part 21*b*, and a back surface part 21*c* of the cooktop case 21 is fixed to a lower surface of the upper plate 26 so that the upper plate 26 may be fixed to the cooktop case 21 by fixing the connecting bracket to the side surface part 21*a*, the front surface part 21*b*, and the back surface part 21*c* of the cooktop case 21.

The upper plate 26 may be provided in the form that seals the inner space of the cooktop case 21 in which the cooktop heating parts 27 are provided or may also be provided in the form in which through-holes are formed so that portions of the cooktop heating parts 27 are exposed through the upper portion of the cooktop case 21.

The cooktop heating parts 27 are provided in the inner space of the cooktop case 21, more specifically, in the inner space corresponding to the first region 22 of the cooktop case 21. One or more cooktop heating parts 27 may be provided in the inner space of the cooktop case 21.

The cooktop heating parts 27 may be provided in the form that includes an induction heating module which cooks food by transmitting current to a magnetic coil, generating eddy current, and heating a cooking container itself or may be provided in the form that includes a radiant heating module which cooks food using radiant heat generated by heating a heating coil.

The cooktop heating parts 27 may also be provided in the form that includes a gas burner which cooks food using flames generated by burning gas fuel.

The cooktop heating parts 27 may also be provided in the form that includes a hidden radiant burner which heats the upper plate using a ceramic uniform burner which uses energy generated by burning gas fuel but uses radiant energy from gas fuel rather than using direct heat.

The heating apparatus 100 is provided inside the cooktop case 21. The heating apparatus 100 is accommodated in the cooktop case 21 so as to be disposed in the second region 23. The heating apparatus 100 may be disposed around the high-temperature cooking unit 25 including the cooktop heating parts 27. The heating apparatus 100 may be disposed to be adjacent to the high-temperature cooking unit 25 in the horizontal direction.

Overall Structure of Heating Apparatus

Figure 4:
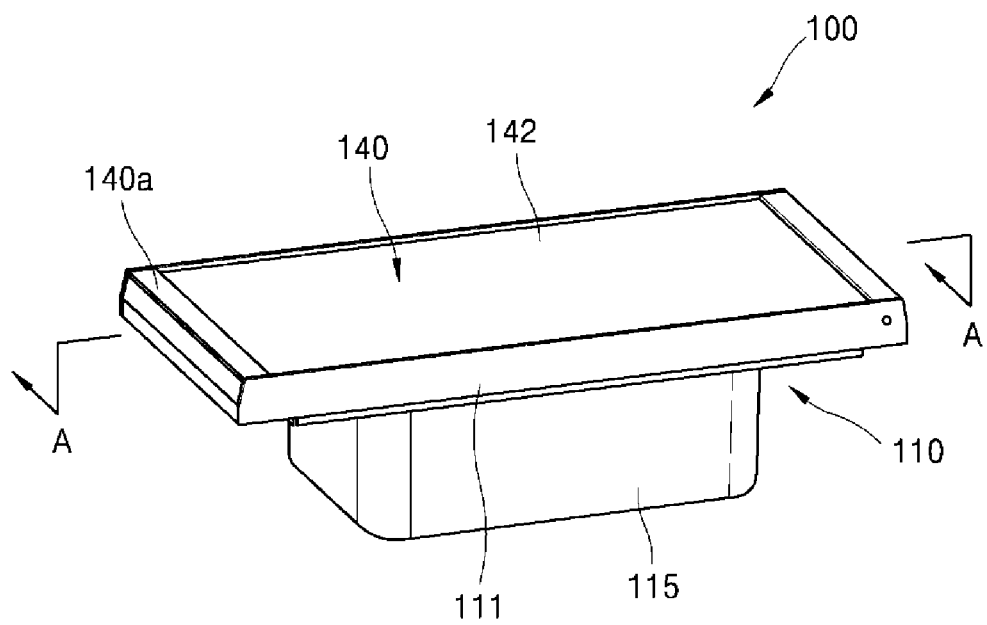
FIG. 4 is a perspective view illustrating a heating apparatus according to an embodiment of the present invention.
Figure 5:
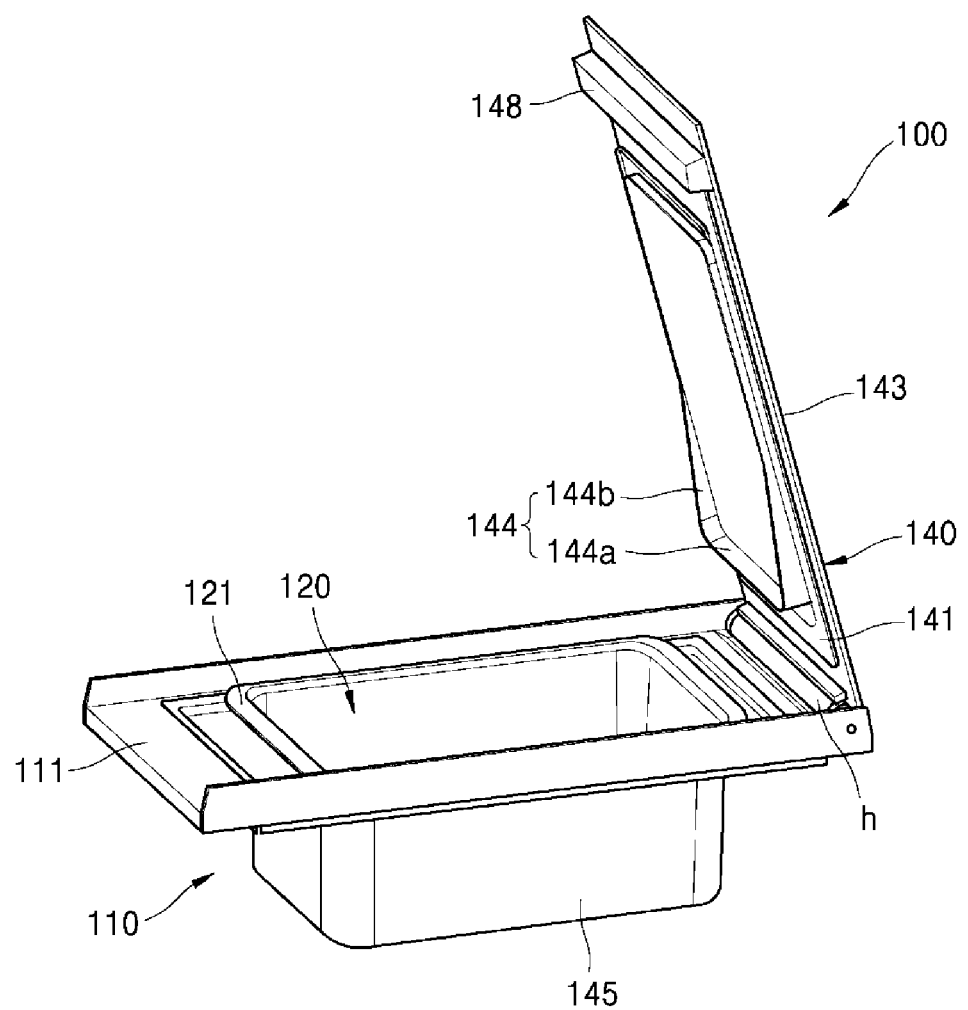
FIG. 5 is a perspective view illustrating a state of the heating apparatus in which a cover thereof is opened according to an embodiment of the present invention.
Figure 6:
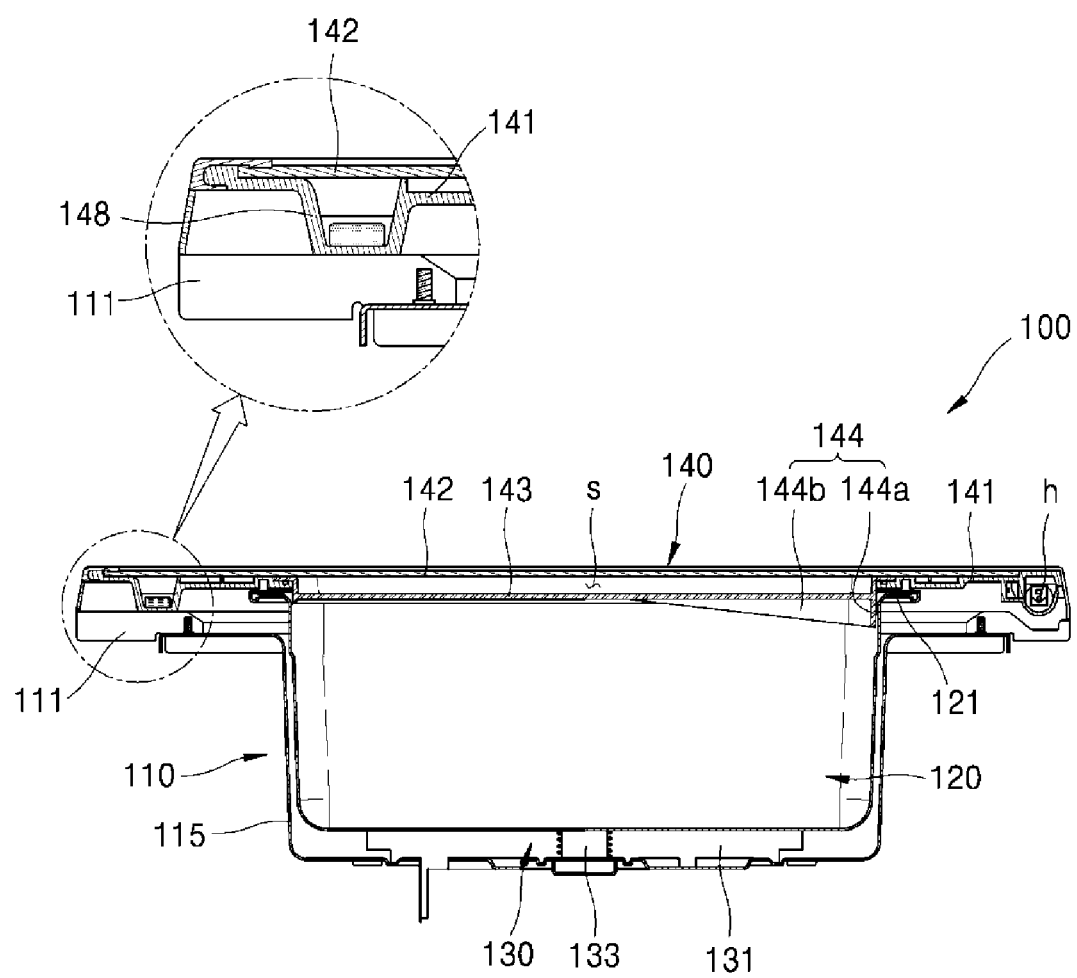
FIG. 6 is a cross-sectional view taken along line A-A of FIG. 1.

FIG. 4 is a perspective view illustrating a heating apparatus according to an embodiment of the present invention, FIG. 5 is a perspective view illustrating a state of the heating apparatus in which a cover thereof is opened according to an embodiment of the present invention, and FIG. 6 is a cross-sectional view taken along line A-A of FIG. 1.

Referring to FIGS. 4 to 6, the heating apparatus 100 includes a housing 110, a container 120, a heating part 130, and a cover 140.

The housing 110 forms a shell of the heating apparatus 100 according to the present embodiment and may include an upper frame part 111 and an accommodating part 115.

The upper frame part 111 is formed in the shape of a quadrilateral frame having a through-hole formed therein.

The accommodating part 115 is disposed inside the upper frame part 111 having the through-hole formed therein. Also, a support surface required for providing a configuration for coupling the cover 140 to the housing 110 is provided at the rear of the upper frame part 111 toward the rear side of the cooking apparatus, and a support surface for supporting a front side of the cover 140, by which the inside of the heating apparatus 100 is sealed, from below is provided at the front of the upper frame part 111 toward the front side of the cooking apparatus.

Also, a sidewall which surrounds a side portion of the cover 140, by which the inside of the heating apparatus 100 is sealed, from the outside may be formed at both side portions of the upper frame part 111. A hinge part h, which will be described below, may be provided at the sidewall of the upper frame part 111 and rotatably couple the cover 140 to the housing 110.

The accommodating part 115 is provided inside the upper frame part 111. The accommodating part 115 is formed in the shape of a metallic box having an accommodation space formed therein and an open upper part. The accommodating part 115 corresponds to a part provided to allow the container 120 to be accommodated in the housing 110. The accommodating part 115 is also a configuration providing a space for mounting configurations, such as the heating part 130, for heating the container 120 accommodated in the housing 110.

In the present embodiment, the accommodating part 115 is formed in the shape of a rectangular parallelepiped box having a width gradually increasing upward and having an accommodation space formed therein and an open upper surface.

Also, the accommodating part 115 may be separately manufactured from the upper frame part 111 and coupled to the upper frame part 111 or may be manufactured to be integrally connected with the upper frame part 111.

The container 120 is provided to accommodate a fluid, such as water, therein. The container 120 may be accommodated inside the housing 110, more specifically, inside the accommodating part 115, so as to be withdrawable.

The container 120 is formed in the shape of a box having the accommodation space formed therein and an open upper part. The container 120 is formed in the shape of a rectangular parallelepiped box that is similar to the shape of the accommodating part 115. In the present embodiment, the container 120 is formed of a metal material having high thermal conductivity.

The heating part 130 is a configuration provided in the housing 110, more specifically, at a bottom surface of the accommodating part 115, so as to heat the fluid accommodated inside the container 120. The heating part 130 is provided as a low-temperature heating part which heats the fluid accommodated inside the container 120 to a temperature lower than or equal to 100° C.

In the present embodiment, the heating part 130 includes a plate-shaped electric heater 131 which is provided at a lower portion of the accommodating part 115 so as to be disposed at a bottom surface of the container 120 mounted inside the accommodating part 115. The electric heater 131 may come in contact with the bottom surface of the container 120 and heat water accommodated inside the container 120.

As other examples, the heating part 130 may be modified in various ways. The heating part 130 may be provided to come in contact with portions other than the bottom surface of the container 120, may be provided in the form of a heater in the shape of a coil, or may be provided in the form that includes a heating apparatus other than an electric heater, e.g., a heating apparatus which heats the container 120 by induction heating.

Further, the heating part 130 may further include a temperature measuring part 133 and a heating temperature controller. The temperature measuring part 133 is provided to measure a temperature of the container 120 heated by the electric heater 131 or a temperature of the water accommodated inside the container 120, and the heating temperature controller is provided to control the operation of the electric heater 131 so that the temperature of the container 120 or the temperature of the water accommodated inside the container 120 is kept at a predetermined temperature. In the present embodiment, the temperature measuring part 133 includes a thermistor, and the heating temperature controller includes a thermostat.

The cover 140 is provided at the housing 110, more specifically, at the upper frame part 111, and opens or closes the open upper part of the housing 110. In the present embodiment, the cover 140 is provided in the shape of a quadrilateral plate having a length extending in the longitudinal direction and a width extending in the horizontal direction.

The cover 140 may be formed so that an upper surface of the cover 140 is coplanar with the upper surface of the upper plate 26 while the cover 140 is closed. In this way, it is possible to provide the cooking apparatus in which an upper surface thereof has a smoothly connected appearance while the high-temperature cooking unit 25 and the heating apparatus 100 are provided with a sense of unity and which facilitates cleaning of the upper surface portion.

The cover 140 formed in the above shape may also have a hidden handle 140a provided at a region of a front end portion so as not to protrude to the outside of the cover 140.

The cover 140 may have a longitudinal rear side rotatably coupled to the housing 110 and may rotate about the rear side rotatably coupled to the housing and open or close the upper part of the housing 110.

For example, a rear side end portion of the cover 140 may be rotatably coupled in the vertical direction to the hinge part h provided in the upper frame part 111 of the housing 110, and the cover 140 may rotate in the vertical direction about the rear side end portion rotatably coupled to the hinge part h and open or close the upper part of the housing 110.

Here, when the hinge part h is formed in the shape of a torque hinge, it is possible to provide a coupling structure for the cover 140 that allows the cover 140 to stably remain standstill at an angle of rotation desired by the user while allowing the cover 140 to smoothly rotate by user manipulation.

In the present embodiment, the hinge part h is formed in the shape of a torque hinge. The hinge part h may be provided in the shape having a large thickness by accommodating therein a damping structure for providing a damping force for suppressing rotation of the cover 140. In this case, the cover 140, more specifically, cover main body parts 141, 142, and 143, should be provided at a position raised from the support surface of the upper frame part 111 by a height corresponding to the thickness of the hinge part h.

Insulation Structure of Cover

Figure 7:
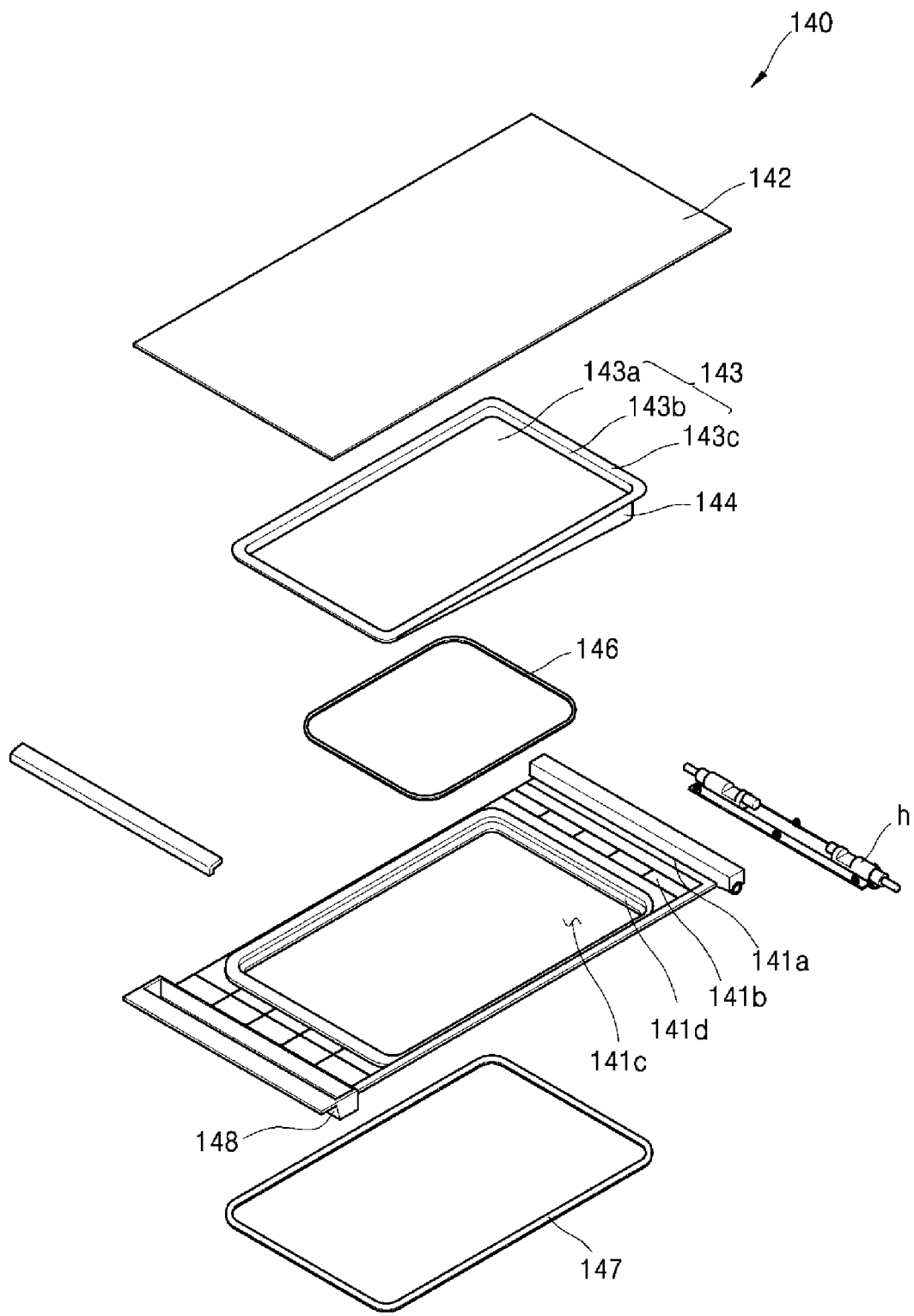
FIG. 7 is an exploded perspective view illustrating an exploded state of each configuration of the cover according to an embodiment of the present invention.
Figure 8:
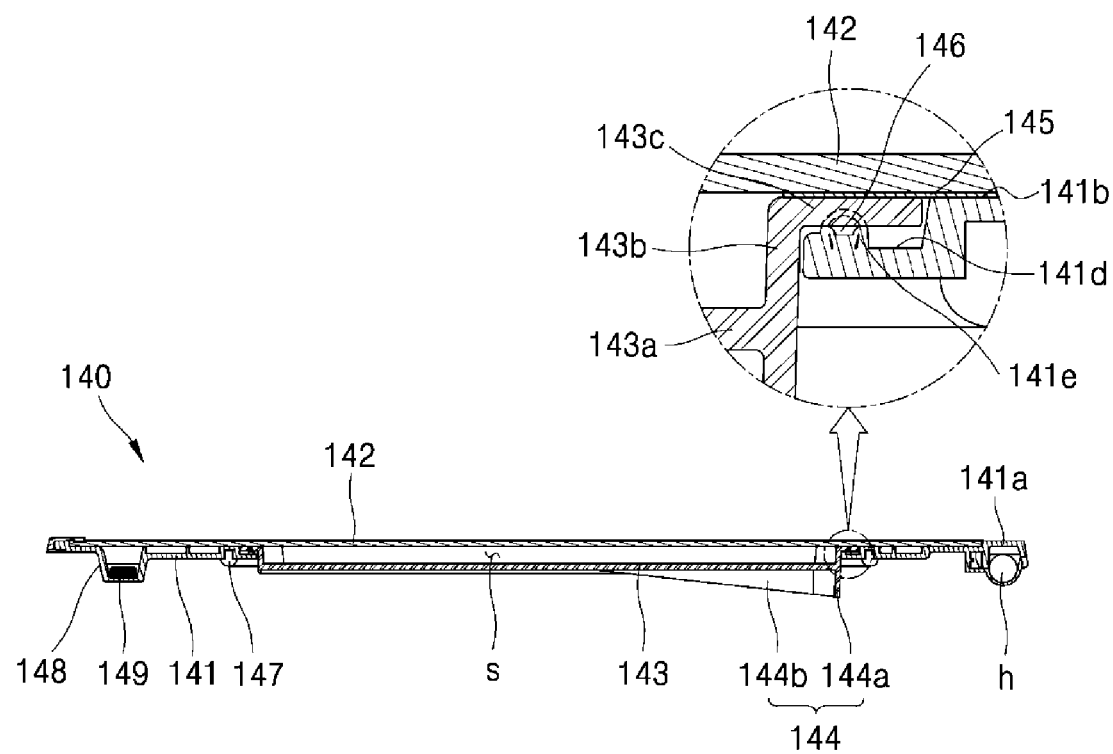
FIG. 8 is a cross-sectional view showing an internal structure of the cover according to an embodiment of the present invention.
Figure 9:
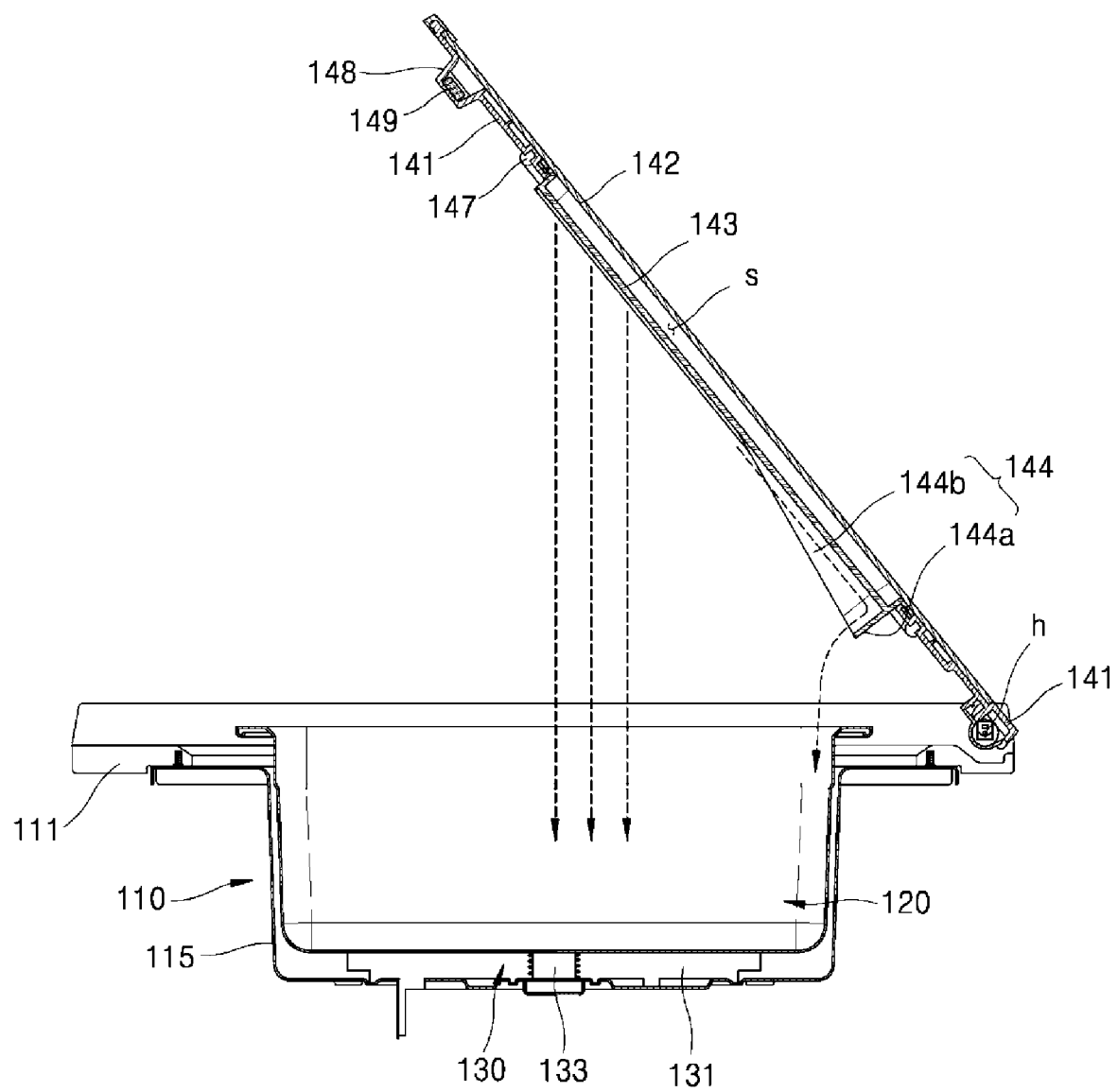
FIG. 9 is a cross-sectional view showing the state of the heating apparatus in which the cover thereof is opened according to an embodiment of the present invention.
Figure 10:
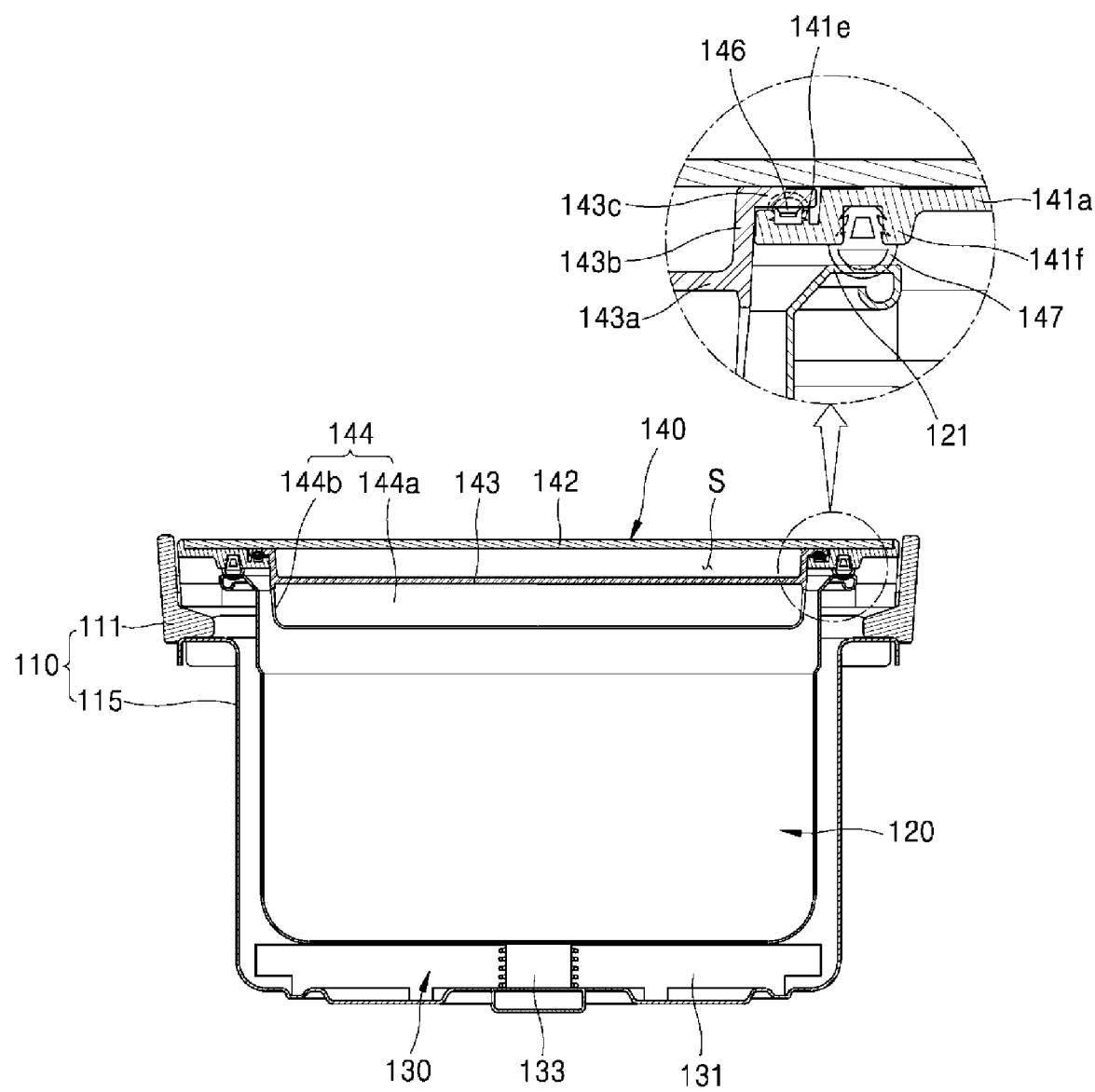
FIG. 10 is a cross-sectional view taken along line B-B of FIG. 1.

FIG. 7 is an exploded perspective view illustrating an exploded state of each configuration of the cover according to an embodiment of the present invention, and FIG. 8 is a cross-sectional view showing an internal structure of the cover according to an embodiment of the present invention. Also, FIG. 9 is a cross-sectional view showing the state of the heating apparatus in which the cover thereof is opened according to an embodiment of the present invention, and FIG. 10 is a cross-sectional view taken along line B-B of FIG. 1.

Referring to FIGS. 6 to 8, the cover 140 may include the cover main body parts 141, 142, and 143 and a guide protrusion part 144.

The cover main body parts 141, 142, and 143 are each provided to have a length extending in the longitudinal direction and a width extending in the horizontal direction. The cover main body parts 141, 142, and 143 are provided in the housing 110 by coupling with the hinge part h provided in the housing 110. The cover main body parts 141, 142, and 143 are provided in the housing 110 so as to be rotatable between an opening position at which the open upper part of the housing 110 is opened and a closing position at which the open upper part of the housing 110 is closed.

At the closing position, in addition to closing the open upper part of the housing 110, the cover main body parts 141, 142, and 143 may also provide a function of covering the open upper part of the container 120 and sealing the container 120.

The cover main body parts 141, 142, and 143 may be provided by coupling rear side end portions of the cover main body parts 141, 142, and 143 to the hinge part h provided in the upper frame part 111 of the housing 110.

In the present embodiment, the cover main body parts 141, 142, and 143 include a cover frame 141, an outer side cover part 142, and an inner side cover part 143.

The cover frame 141 is provided to form a shell of the cover 140. The cover frame 141 is coupled to the hinge part h and rotatably provided in the housing 110. The cover frame 141 is provided in the shape of a quadrilateral plate material that corresponds to the shape of the upper frame part 111. The cover frame 141 is coupled to a lower portion of the outer side cover part 142 and supports the outer side cover part 142. A through-part 141c is formed to pass through an inner side of the cover frame 141 in the vertical direction, and an internal state of the heating apparatus 100 covered by the cover 140 may be checked from the outside through the through-part 141c. That is, the through-part 141c serves as a see-through window that allows the user to check the internal state of the heating apparatus 100 from the outside.

The outer side cover part 142 is provided to be disposed at an outer side of the cover frame 141, i.e., at an upper portion of the cover frame 141 when the cover 140 is at the closing position. The outer side cover part 142 is coupled to the cover frame 141 and forms an outer side surface (or an upper surface) of the cover 140. The outer side cover part 142 may be provided in the shape of a quadrilateral plate material having the shape of a flat plate capable of covering the through-part 141c and may be formed of a glass or plastic material that is transparent or translucent.

The inner side cover part 143 is provided to be disposed at an inner side of the cover frame 141, i.e., at a lower portion of the cover frame 141 when the cover 140 is at the closing position. The inner side cover part 143 is coupled to the cover frame 141 and forms an inner side surface of the cover 140. The inner side cover part 143 may be provided to have an area that allows it to cover the through-part 141c and may be formed of a glass or plastic material that is transparent or translucent.

According to the present embodiment, a sealing space s that is surrounded by the outer side cover part 142 and the inner side cover part 143 is formed between the outer side cover part 142 and the inner side cover part 143. That is, inside the cover 140, the sealing space s that is surrounded by the outer side cover part 142 and the inner side cover part 143 is formed, and the sealing space s formed in this way provides a space for forming the insulating air layer between the outer side cover part 142 and the inner side cover part 143 inside the cover 140.

The insulating air layer formed in the sealing space s as described above serves to block transfer of heat from the inner side cover part 143 to the outer side cover part 142. That is, the insulating air layer acts to prevent an excessive rise of the surface temperature of the cover 140 by blocking transfer of heat, which is transferred by the heated container 120 and the water heated inside the container 120, to the outer side cover part 142 through the inner side cover part 143.

In this way, the heating apparatus 100 according to the present embodiment can prevent the surface of the cover 140 from overheating and reduce the risk of an accident in which a user gets burned due to coming in contact with the surface of the cover 140 heated to a high temperature.

Structure for Forming Sealing Space in Cover

Hereinafter, a structure for forming the sealing space s inside the cover 140 will be described.

According to the present embodiment, the inner side cover part 143 may include a planar part 143a, a sidewall part 143b, and an extension part 143c.

The planar part 143a is provided in the shape of a flat plate which forms a plane parallel to the outer side cover part 142. The planar part 143a is disposed at the inner side of the cover frame 141 and disposed to be spaced a predetermined distance apart from the outer side cover part 142 so that the sealing space s is formed between the outer side cover part 142 and the planar part 143a.

The sidewall part 143b is formed to extend toward the outer side cover part 142 from an edge of the planar part 143a. The sidewall part 143b forms a sidewall surrounding the sealing space s, which is formed between the outer side cover part 142 and the planar part 143a, from a side portion thereof.

The extension part 143c forms a plane extending from the sidewall part 143b in an outward direction parallel to the outer side cover part 142. The extension part 143c may form the shape of a flange protruding outward from an end portion of the sidewall part 143b and come in close contact with the outer side cover part 142 while coming in surface contact with an inner side surface of the outer side cover part 142.

The inner side cover part 143 formed of the above-described configuration is formed in the shape of a flat box with an open upper part and is coupled to the inner side surface of the outer side cover part 142 so that the open upper part is covered by the outer side cover part 142. Accordingly, the sealing space s surrounded by the inner side cover part 143 and the outer side cover part 142 is formed inside the inner side cover part 143.

Also, the inner side cover part 143 may come in close contact with the outer side cover part 142 while coming in surface contact with the inner side surface of the outer side cover part 142 through the extension part 143c. In this way, stability of coupling between the inner side cover part 143 and the outer side cover part 142 may be improved, and airtight performance at the coupling portion between the inner side cover part 143 and the outer side cover part 142 for maintaining the sealing space s may be improved.

Meanwhile, the cover frame 141, at which the outer side cover part 142 and the inner side cover part 143 are provided, may include a frame main body part 141a, a first seating surface 141b, the through-part 141c, and a second seating surface 141d.

The frame main body part 141a forms a shell of the cover frame 141 and is provided in the shape of a quadrilateral plate material that corresponds to the shape of the upper frame part 111.

The first seating surface 141b is concavely formed in the frame main body part 141a and forms, at the frame main body part 141a, a concave plane so that the outer side cover part 142 is seated thereon. The first seating surface 141b may be disposed between an edge of the frame main body part 141a and the through-part 141c, and the outer side cover part 142 may be coupled to the frame main body part 141a while being seated on the first seating surface 141b.

The through-part 141c is formed to pass through an inner side of the frame main body part 141a. While serving as the see-through window that allows the user to check the internal state of the heating apparatus 100 from the outside, the see-through part 141c forms a path through which portions of the inner side cover part 143, i.e., the planar part 143a and the sidewall part 143b, may pass inside the frame main body part 141a.

The second seating surface 141d is concavely formed in the frame main body part 141a and disposed between the first seating surface 141b and the through-part 141c. The second seating surface 141d is concavely formed in the frame main body part 141a so that a step is formed between the first seating surface 141b and the second seating surface 141d. In the present embodiment, the second seating surface 141d forms a more concave plane than the first seating surface 141b. A protruding upper end edge of the inner side cover part 143, i.e., the extension part 143c is seated on the second seating surface 141d formed as above. The inner side cover part 143 may be coupled to the frame main body part 141a while the extension part 143c is seated on the second seating surface 141d.

According to the above-described coupling structure among the cover frame 141, the outer side cover part 142, and the inner side cover part 143, the cover frame 141 and the inner side cover part 143 may be coupled by fitting the inner side cover part 143 to the cover frame 141 in the form in which the planar part 143a and the sidewall part 143c are passed from the upper portion of the cover frame 141 to the lower portion of the cover frame 141 and the extension part 143c is seated on the second seating surface 141d.

Also, in the state in which the cover frame 141 and the inner side cover part 143 are coupled, the cover frame 141 and the outer side cover part 142 may be coupled in the form in which the outer side cover part 142 is seated on the first seating surface 141b.

Meanwhile, the cover 140 may further include a first sealing member 145 and a second sealing member 146.

The first sealing member 145 is provided between the outer side cover part 142 and the inner side cover part 143 and between the outer side cover part 142 and the cover frame 141 and serves to seal between the outer side cover part 142 and the extension part 143c and between the outer side cover part 142 and the first sealing surface 141b.

In the present embodiment, the first sealing member 145 is provided in the form of sealant applied between the outer side cover part 142 and the extension part 143c and between the outer side cover part 142 and the first sealing surface 141b. The first sealing member 145 serves to couple the outer side cover part 142 and the extension part 143c while sealing between the outer side cover part 142 and the extension part 143c and serves to couple the outer side cover part 142 and the first seating surface 141b while sealing between the outer side cover part 142 and the first seating surface 141b.

The second sealing member 146 is provided between the second seating surface 141d and the extension part 143c. In the present embodiment, the second sealing member 146 is provided in the shape of a quadrilateral ring formed of a silicone rubber material, and a first fitting rib 141e for fitting and coupling the second sealing member 146 is formed to protrude from the second seating surface 141d. The second sealing member 146 is fitted and coupled to the first fitting rib 141e and fixed to the upper portion of the second seating surface 141d and is provided to protrude upward more than the first fitting rib 141e.

The second sealing member 146 provided as above serves to seal between the extension part 143c and the second seating surface 141d while elastically supporting the extension part 143c from below the extension part 143c. Also, the second sealing member 146 may elastically support the extension part 143c in a direction in which the extension part 143c comes in close contact with the outer side cover part 142. By the action of the second sealing member 146, the extent of close contact between the extension part 143c and the outer side cover part 142 becomes higher. In this way, the airtight performance at the coupling portion between the inner side cover part 143 and the outer side cover part 142 for maintaining the sealing space s may be further improved.

According to the above-described structure for forming the sealing space s in the cover 140, the sealing space s is formed inside the cover 140 by coupling the outer side cover part 142, which is formed in the shape of a flat plate, to the open upper part of the inner side cover part 143, which is formed in the shape of a flat box with the open upper part, and each coupling portion surrounding the sealing space s is sealed by the double sealing structure formed by combination of the first sealing member 145 and the second sealing member 146.

In this way, the insulating air layer formed in the sealing space s is effectively maintained such that it is possible to provide the cover 140 whose insulation performance is effectively improved. Further, it is possible to prevent dew from forming on the inner side surface of the outer side cover part 142 by preventing water vapor, which is generated in the process of heating water for cooking, from penetrating into the sealing space s.

Structure for Guiding Condensed Water

Referring to FIGS. 7 to 9, the guide protrusion part 144 is provided to protrude from the inner side surfaces (or the lower surfaces) of the cover main body parts 141, 142, and 143. Specifically, the guide protrusion part 144 is provided to protrude from the inner side surface of the inner side cover part 143 that faces the container 120 at the closing position. The guide protrusion part 144 is inserted into the container 120 at the closing position and, at the opening position, has at least a portion protruding by a length that allows it to be located in a region of the upper part of the container 120. In this way, a guide structure for guiding a falling position of condensed water is formed so that the condensed water formed on the inner side surface of the cover 140 falls into the container 120.

The guide protrusion part 144 is disposed at the rear sides of the cover main body parts 141, 142, and 143, which are adjacent to the hinge part h, and is formed to protrude in a thickness direction of the inner side cover part 143 from an edge portion of the inner side cover part 143. The guide protrusion part 144 may include a first guide surface 144a and a second guide surface 144b.

The first guide surface 144a is formed to protrude from the cover main body parts 141, 142, and 143 so as to have a length extending in the thickness direction of the cover main body parts 141, 142, and 143 and a width extending in the width direction of the cover main body parts 141, 142, and 143.

In other words, the first guide surface 144a protrudes from the inner side cover part 143 so as to have a length extending in the thickness direction of the inner side cover part 143 and a width extending in the width direction of the inner side cover part 143.

For example, assuming that the cover 140 is at the closing position, the first guide surface 144a is formed in a vertical planar shape that extends downward from the inner side cover part 143 so as to have a length extending in the vertical direction and a width extending in the horizontal direction.

The first guide surface 144a formed as above forms a vertical plane extending from the cover main body parts 141, 142, and 143 so as to be parallel to the rear side surface of the container 120 at the closing position, forms a plane extending from the cover main body parts 141, 142, and 143 so as to be parallel to the bottom surface of the container 120 at the opening position, and forms a plane inclined downward toward the container 120 from the cover main body parts 141, 142, and 143 between the closing position and the opening position.

Here, the opening position is a position at which the cover 140 is rotated to open the upper part of the housing 110 and rotated to be perpendicular to the upper frame part 111 of the housing 110.

According to the present embodiment, at the opening position, the first guide surface 144a protrudes by a length that allows at least a portion thereof to be disposed in the region of the upper part of the container 120. The first guide surface 144a serves to guide the falling position of the condensed water so that the condensed water, which is formed on the inner side surface of the cover 140, more specifically, on the inner side cover part 143, and then flows down along the inner side surface of the cover 140 in the process of opening the cover 140, falls into the container 120 instead of falling to the outside of the container 120.

In the process in which the heating apparatus 100 cooks an object to be cooked, when the cover 140 closes the upper part of the container 120 and the heating part 130 heats the container 120, the fluid accommodated inside the container 120 is heated and water vapor is generated. The water vapor generated in this way is attached to the inner side surface of the cover 140. When the amount of water vapor attached to the inner side surface of the cover 140 becomes large, the large amount of water vapor is condensed and is formed in the form of condensed water on the inner side surface of the cover 140.

In this state, when the cover 140 is opened, a portion of the condensed water formed on the inner side surface of the cover 140 falls from the cover 140 in the process of opening the cover 140 and falls back into the container 120. Also, the residual condensed water that does not fall from the cover 140 flows down along the inner side surface of the cover 140 which is stood upright due to being opened.

When the condensed water flowing down as above flows down to the lower portion of the cover 140 instead of flowing back into the container 120, a problem occurs in that surroundings of the heating apparatus 100 is polluted or soaked with water due to the water flowing down to the lower portion of the cover 140.

In consideration of this, in the present embodiment, the guide protrusion part 144 is provided at the inner side surface of the cover 140, and the falling position of the condensed water is guided through the first guide surface 144a of the guide protrusion part 144 provided as above.

According to the present embodiment, the condensed water, which flows down along the inner side surface of the cover 140 without falling from the cover 140 when the cover 140 is opened, reaches the first guide surface 144a of the guide protrusion part 144 formed at the rear sides of the cover main body parts 141, 142, and 143, which are adjacent to the hinge part h. Also, the condensed water, which flows down to the position at which the first guide surface 144a is reached, flows in a direction toward the container 120, i.e., a forward direction, along the first guide surface 144a without further flowing down along the inner side surface of the cover 140.

The condensed water guided to flow forward by the first guide surface 144a as above flows back into the container 120 without flowing and leaking to the outside of the heating apparatus 100. In this way, the surroundings of the heating apparatus 100 can be prevented from being polluted or soaked with water due to the condensed water formed on the cover 140, and the cooking apparatus and the surroundings thereof can be kept clean.

In the present embodiment, at the opening position, the first guide surface 144a protrudes by a length that allows at least a portion thereof to be disposed in the region of the upper part of the container 120. However, the length by which the first guide surface 144a protrudes may be shorter.

In this case, when the cover 140 is completely opened, a portion of the condensed water, whose flow is guided by the first guide surface 144a, may not fall into the container 120 in some cases. However, even in this case, because the falling position of the condensed water is restricted to the inside of the heating apparatus 100, the surroundings of the heating apparatus 100 can be prevented from being polluted or soaked with water.

Further, the guide protrusion part 144 according to the present embodiment may include the second guide surface 144b disposed at both sides of the first guide surface 144a in the width direction.

The second guide surface 144b is provided in the form of being connected to each of both side end portions of the first guide surface 144a in the width direction, and each second guide surface 144b is formed to protrude from the cover main body parts 141, 142, and 143 so as to have a length extending in the thickness direction of the cover main body parts 141, 142, and 143 and a with extending in the longitudinal direction of the cover main body parts 141, 142, and 143.

In other words, the second guide surface 144b protrudes from the inner side cover part 143 so as to have a length extending in the thickness direction of the inner side cover part 143 and a width extending in the longitudinal direction of the inner side cover part 143.

For example, assuming that the cover 140 is at the closing position, the second guide surface 144b is formed in a vertical planar shape that extends downward from the inner side cover part 143 so as to have a length extending in the vertical direction and a width extending in the horizontal direction.

The second guide surface 144b formed as above serves to guide the flow of condensed water at the side portion of the cover 140 so that the condensed water formed on the inner side surface of the cover 140 is collected on the first guide surface 144a without flowing to the outside of the cover 140 in a lateral direction thereof.

Airtight Structure Between Container and Cover

Referring to FIGS. 6 and 10, the container 120 is formed in the shape of a rectangular parallelepiped box having an open upper part, and an upper end bending part 121 is formed at the upper end of the container 120.

The upper end bending part 121 is formed to protrude in an outward direction parallel to the frame main body part 141a from an upper end of a side surface of the container 120. That is, the upper end bending part 121 is formed in the shape of a flange protruding from the upper end of the side surface of the container 120 formed to extend in the vertical direction while forming a plane in the horizontal direction.

Further, the cover 140 may further include a third sealing member 147.

The third sealing member 147 is provided to protrude from the inner side surface of the frame main body part 141a facing the upper end bending part 121. In the present embodiment, the third sealing member 147 is provided in the shape of a quadrilateral ring formed of a silicone rubber material, and a second fitting rib 141f for fitting and coupling the third sealing member 147 is formed to protrude from the inner side surface of the frame main body part 141a. The third sealing member 147 is fitted and coupled to the second fitting rib 141f and fixed to the inner side surface of the frame main body part 141a and is provided to protrude toward the container 120 therebelow more than the second fitting rib 141f.

When the cover 140 is at the closing position, the third sealing member 147 serves to come in close contact with the upper end bending part 121 and seal between the frame main body part 141a and the upper end bending part 121.

Hereinafter, the airtight structure between the container 120 and the cover 140 will be described in more detail.

When the cover 140 is at the closing position, while the open upper part of the housing 110 is covered by the cover 140 and closed, the inside of the container 120 is also sealed by the cover 140.

That is, the closing of the inside of the heating apparatus 100 that is performed by the cover 140 is performed in the form in which, as the open upper part of the housing 110 is covered by the cover 140, the inside of the container 120 is also sealed by the cover 140, instead of being performed in the form in which simply the cover 140 covers the open upper part of the housing 110.

The sealing of the inside of the container 120 is performed in the form in which the inner side surface of the cover 140 covers the open upper part of the container 120. Here, as the third sealing member 147 provided in the inner side surface of the cover 140 seals between the frame main body part 141a and the upper end bending part 121, the inside of the container 120 is effectively sealed by the cover 140.

Also, while the inner side surface of the cover 140 covers the open upper part of the container 120 as described above, the guide protrusion part 144 is inserted into the container 120, and the guide protrusion part 144 inserted in this way serves as a structure for narrowing a width of a path through which water vapor exits the inside of the container 120.

Accordingly, because the water vapor generated as the fluid accommodated inside the container 120 is heated is suppressed from exiting to the outside of the container 120, and, even when the water vapor exits through the narrow path between the inner side surface of the container 120 and the guide protrusion part 144, the third sealing member 147, which seals between the frame main body part 141a and the upper end bending part 121, blocks external leakage of the water vapor, the water vapor generated inside the container 120 stays inside the container 120 instead of exiting to the outside of the container 120.

That is, the airtight performance between the cover 140 and the container 120 may be effectively improved by a double blocking structure which is formed by combining an inner side protruding structure of the container 120, which is formed by the guide protrusion part 144 forming a sidewall structure inside the container 120, and a sealing structure, which is formed between the cover 140 and the container 120 by the third sealing member 147. In this way, it is possible to effectively prevent external leakage of the water vapor generated inside the container 120.

Further, the guide protrusion part 144 forming the sidewall structure inside the container 120 as described above may also serve to guide the water vapor to be attached on a region of the inner side of the guide protrusion part 144, that is, on a region in which the water vapor may be collected on the guide protrusion part 144 when the condensed water flows down.

Meanwhile, referring to FIGS. 6 and 7, the cover 140 according to the present embodiment may further include a protruding bar 148 which is provided at a front side of the cover 140.

The protruding bar 148 is disposed at front sides of the cover main body parts 141, 142, and 143 and is provided to protrude from the inner side surface of the frame main body part 141*a* facing the housing 110. The protruding bar 148 is formed to protrude from the cover main body parts 141, 142, and 143 so as to have a height extending in the thickness direction of the cover main body parts 141, 142, and 143 and a width extending in the width direction of the cover main body parts 141, 142, and 143.

For example, assuming that the cover 140 is at the closing position, the protruding bar 148 is formed to protrude from the cover main body parts 141, 142, and 143 so as to have a height extending in the vertical direction and a width extending in the horizontal direction.

Here, the width of the protruding bar 148 may be a width corresponding to the width of the upper frame part 111. The height of the protruding bar 148 may be a height at which the protruding bar 148 may support the cover 140 so that the cover 140 remains level when the cover 140 is at the closing position.

The protruding bar 148 provided as described above is integrally provided with the cover 140 and rotates together with the cover 140. When the cover 140 is at the closing position, the protruding bar 148 comes in close contact with the upper frame part 111 of the housing 110 and forms a blocking wall at an upper front portion of the container 120.

By providing the protruding bar 148 at the front side of the cover 140, the following effects can be achieved.

First, by forming the blocking wall at the upper front portion of the container 120, it is possible to block the heat transferred to the front of the heating apparatus 100 from entering the container 120.

While cooking using the heating apparatus 100 and cooking using the cooktop part 20 (see FIG. 1) are performed together, a phenomenon in which heat generated from the cooktop part 20 is transferred to the front of the heating apparatus 100 may occur. Particularly, in a case in which the door 32 (see FIG. 1) of the cooktop part 20 is opened, high-temperature heat which exits the inside of the cooktop part 20 may rise to an upper portion and be transferred to the front of the heating apparatus 100.

When the heat enters the container 120, the heat may significantly affect a result of cooking using the heating apparatus 100. In the case of cooking using a sous-vide recipe, it is important to keep the temperature of water for cooking food constant for a long time. When the temperature of water is affected by heat other than the heat provided by the heating part 130 of the heating apparatus 100 itself, it may be difficult to properly perform temperature control for keeping the temperature of water constant.

For example, when other heat introduced from the outside acts such that only the temperature measured by the temperature measuring part increases without actually increasing the temperature of water, a phenomenon in which the actual temperature of water is lower than the temperature measured by the temperature measuring part may occur. When other heat introduced from the outside acts as a heat source that actually increases the temperature of water without being sensed by the temperature measuring part, the phenomenon in which the actual temperature of water is lower than the temperature measured by the temperature measuring part may occur. For these reasons, temperature control for keeping the temperature of water constant becomes difficult accordingly.

In consideration of this aspect, when cooking is performed by the heating apparatus 100, the cover 140 according to the present embodiment causes the blocking wall to be formed at the upper front portion of the container 120 by the protruding bar 148 provided at the front of the cover 140. In this way, it is possible to prevent the heat transferred to the front of the heating apparatus 100 from entering the container 120 and affecting the control of the temperature of water.

Second, the protruding bar 148 may support the cover 140 so that the cover 140 remains level when the cover 140 is at the closing position.

In the present embodiment, the hinge part h is formed in the shape of a torque hinge. The hinge part h may be provided in the shape having a large thickness by accommodating therein a damping structure for providing a damping force for suppressing rotation of the cover 140. In this case, the cover 140 should be provided at a position raised from the support surface of the upper frame part 111 by a height corresponding to the thickness of the hinge part h.

In this state, for the cover 140 to remain level, the front side and the rear side of the cover 140 should be supported at the same height. To this end, the front side of the cover 140 should also be supported at the height same as the height at which the rear side of the cover 140 is supported by the hinge part h.

According to the present embodiment, the protruding bar 148, which has a height at which the cover 140 may be supported to remain level when the cover 140 is at the closing position, is provided at the front side of the cover 140. The protruding bar 148 may be provided as a support structure for supporting the front side of the cover 140 and the rear side of the cover 140 at the same height.

In this way, the cover 140 may be kept in a level state in which the heights of the front side and the rear side of the cover 140 are the same, and the upper surface of the cover 140 may be coplanar with the upper surface of the upper plate 26 while the cover 140 is closed.

Third, the protruding bar 148 allow formation of the handle 140*a*, which is to be gripped by the user when the user attempts to rotate the cover 140, without adding a separate structure to the cover 140.

According to the present embodiment, the protruding bar 148 is disposed at a position spaced a predetermined distance apart rearward from a front edge of the cover 140. Accordingly, an insertion space surrounded in a U-shape open leftward by the cover 140, the protruding bar 148, and the housing 110 is formed at a front side of the protruding bar 148.

Also, when the cover 140 is provided so that a separation space is formed between the front end portion of the cover 140 and the cooktop case 21 or an outer case accommodating the heating apparatus 100, the insertion space may be opened toward the upper portion of the cover 140 through the separation space.

The insertion space formed as above is provided as a space in which a hand of the user attempting to grip the front end portion of the cover 140 may be inserted into the lower portion of the cover 140. A region of the front end portion of the cover 140 that is disposed at an upper portion of the insertion space may be provided in the shape of the hidden handle 140a which is provided so as not to protrude to the outside of the cover 140.

Fourth, when manipulation in which the user closes the cover 140 is performed, the protruding bar 148 may provide a function that facilitates closing of the cover 140 and a function that allows the closed state of the cover 140 to be stably maintained.

According to the present embodiment, the cover 140 may further include a magnetic member 149 which is provided inside the protruding bar 148 and provides a magnetic force that causes the protruding bar 148 to come in close contact with the housing.

Also, at least a portion of the housing 110 which comes in contact with the protruding bar 148 when the cover 140 is at the closing position may be formed of a magnetic body, such as metal, that may be attracted to the magnetic member 149.

Because the magnetic member 149 is provided inside the protruding bar 148 as described above, when the cover 140 is rotated only to the extent that the magnetic member 149 may attract the housing 110 when the manipulation in which the user closes the cover 140 is performed, rotation of the cover 140 may be guided by an attractive force that acts between the magnetic member 149 and the housing 110. Therefore, the cover 140 may be smoothly closed even with a small force.

Also, because the magnetic member 149 is provided inside the protruding bar 148 as described above, when the cover 140 is at the closing position, the coupling state between the housing 110 and the front side of the cover 140 may be firmly maintained by the attractive force acting between the magnetic member 149 and the housing 110.

In this way, when the cover 140 is at the closing position, an occurrence of a phenomenon in which the cover 140 shakes due to a small impact may be prevented, and a state in which the cover 140 seals the container 120 may be stably maintained. Thus, it is possible to further improve the airtight performance between the cover 140 and the container 120.

As another example, the cover 140 may be provided in the form in which a heavy weight that does not provide a magnetic force but has a large weight is provided inside the protruding bar 148. Here, the weight of the heavy weight may be determined within a proper range in which the extent of close contact between the protruding bar 148 and the housing 110 may be increased without degrading the function of the hinge part h formed in the shape of a torque hinge.

Also, because the heavy weight is provided inside the protruding bar 148 as described above, the weight of the front side of the cover 140 is increased. In this way, when the cover 140 is at the closing position, the occurrence of the phenomenon in which the cover 140 shakes due to a small impact may be prevented, and the cover 140 may press the container 120 with a slightly greater force. Thus, it is possible to further improve the airtight performance between the cover 140 and the container 120.

Meanwhile, as described above, the heating apparatus 100 provided in the cooking apparatus according to the present embodiment may be provided in the cooktop case 21 (see FIG. 3) together with the high-temperature cooking unit 25 (see FIG. 3) to constitute a single cooking apparatus or may also be manufactured as a separate apparatus for low-temperature vacuum cooking.

In the case in which the heating apparatus 100 is manufactured as a separate apparatus for low-temperature vacuum cooking, the heating apparatus 100 may be configured in the form further including an outer case, which has the housing 110 accommodated therein and forms the exterior of the heating apparatus 100, and a separate control panel for separately controlling the operation of the heating apparatus 100.

The present invention has been described by referring to the embodiments illustrated in the accompanying drawings, but the above description is merely illustrative, and those of ordinary skill in the art to which the present invention pertains should understand that various modifications and other equivalent embodiments are possible from the above embodiments. Therefore, the actual technical scope of the present invention should be defined by the claims below.

DESCRIPTION OF REFERENCE NUMERALS

10: main body
20: cooktop part
21: cooktop case
22: first region
23: second region
25: high-temperature cooking unit
26: upper plate
27: cooktop heating part
28: barrier
30: oven part
100: heating apparatus
110: housing
111: upper frame part
115: accommodating part
120: container
121: upper end bending part
130: heating part
131: electric heater
140: cover
140a: handle
141: cover frame
141a: frame main body part
141b: first seating surface
141c: through-part
141d: second seating surface
141e: first fitting rib
141f: second fitting rib
142: outer side cover part
143: inner side cover part
143a: planar part
143b: sidewall part
143c: extension part
144: guide protrusion part
144a: first guide surface
144b: second guide surface
145: first sealing member 146: second sealing member
147: third sealing member
148: protruding bar
149: magnetic member
h: hinge part
s: sealing space

The invention claimed is:

1. A heating apparatus, comprising:
a housing having an accommodation space formed therein and an opening at an upper portion thereof;
a container configured to be inserted into the accommodation space and having an opening at an upper portion thereof and a space formed therein to accommodate a fluid;
a heater configured to heat the fluid accommodated inside of the container; and
a cover configured to cover the opening in the housing, wherein the cover includes a cover main body having a length extending in a longitudinal direction and a width extending in a horizontal direction, wherein the cover main body is configured to be rotatable between an open position in which position the opening of the housing is open and a closed position in which position the opening of the housing is closed, wherein the cover main body covers the opening of the container and seals the container in the closed position, wherein the cover main body includes:
a cover frame configured to form a shell of the cover;
an outer cover coupled to the cover frame; and
an inner cover coupled to the cover frame so as to be disposed below the outer cover in the closed position, wherein the outer cover is formed in a shape of a flat plate, wherein a sealing space is formed between the outer cover and the inner cover, wherein the inner cover includes:
a planar portion which forms a plane parallel to the outer cover and is disposed to be spaced a predetermined distance apart from the outer cover so that the sealing space is formed between the outer cover and the planar portion;
a sidewall that extends toward the outer cover from an edge of the planar portion and surrounds the sealing space; and
an extension that forms a plane that extends from the sidewall in an outward direction parallel to the outer cover and contacts the outer cover, and wherein the cover frame includes:
a frame main body configured to form a shell of the cover frame;
a first seating surface which is concavely formed in the frame main body and forms a concave plane configured to receive the outer cover seated thereon;
a through-hole that passes through the first seating surface and form a path through which the planar portion and the sidewall pass; and
a second seating surface disposed between the first seating surface and the through-hole, concavely formed in the frame main body so that a step is formed between the first seating surface and the second seating surface, and forming a concave plane configured to receive the extension seated thereon.

2. The heating apparatus of claim 1, wherein the cover further includes a protruding bar disposed at a front side of the cover main body and protruding from an inner side surface of the frame main body facing the housing, and configured to contact the housing in the closed position to form a blocking wall at a front portion of the container.

3. The heating apparatus of claim 2, wherein the cover further includes a magnetic member provided inside of the protruding bar and providing a magnetic force that causes the protruding bar to come in contact with the housing.

4. The heating apparatus of claim 1, wherein the cover further includes a guide protrusion that protrudes from the cover main body, is configured to be inserted into the container in the closed position, and in the open position, has at least a portion that protrudes by a length that allows it to be located in an upper portion of the container.

5. The heating apparatus of claim 4, wherein the cover further includes a hinge configured to couple a rear side of the cover main body to a rear side of the housing so as to be rotatable in a vertical direction, and wherein the guide protrusion is disposed at the rear side of the cover main body adjacent to the hinge.

6. The heating apparatus of claim 5, wherein the guide protrusion includes a first guide surface that protrudes from the cover main body so as to have a length extending in a thickness direction of the cover main body and a width extending in a width direction of the cover main body.

7. The heating apparatus of claim 6, wherein the first guide surface forms a plane extending from the cover main body so as to be parallel to a rear side surface of the container in the closed position, forms a plane extending from the cover main body so as to be parallel to a bottom surface of the container in the open position, and forms a plane inclined downward toward the container from the cover main body between the closed position and the open position.

8. The heating apparatus of claim 6, wherein the guide protrusion includes a second guide surface connected to both side end portions of the first guide surface in a width direction thereof, and wherein the second guide surface protrudes from the cover main body so as to have a length extending in the thickness direction of the cover main body and a width extending in a longitudinal direction of the cover main body.

9. A cooking apparatus, comprising:
a cooktop case;
a heating apparatus provided at an inside or an outside of the cooktop case, wherein the heating apparatus includes:
a housing having an accommodation space formed therein and an opening at an upper portion thereof;
a container which is inserted into the accommodation space inside of the housing and having an opening at an upper portion thereof and a space formed therein to accommodate a fluid;
a heater configured to heat the fluid accommodated inside of the container; and
a cover configured to cover the opening of the housing, wherein the cover includes a cover main body provided to have a length extending in a longitudinal direction and a width extending in a horizontal direction, provided at the housing so as to be rotatable between an open position at which position the opening of the housing is open and a closed position at which position the opening of the housing is closed, and configured to cover the opening of the container and seal the container in the closed position; and
a cooktop heater provided in the cooktop case, wherein the heating apparatus is disposed adjacent to the cooktop heater, wherein the cover further includes a hinge, which is configured to couple a rear side of the cover to a rear side of the housing so as to be rotatable in a vertical direction and configured to support the rear side of the cover, and a protruding bar that protrudes from a front side of the cover and is supported by the housing and supports the front side of the cover in the closed position, and wherein the protruding bar protrudes by a height at which the cover is able to be supported to remain level when the cover is in the closed position.

10. The cooking apparatus of claim 9, wherein the protruding bar is disposed at a position spaced a predetermined distance apart rearward from a front edge of the cover, and wherein a U-shaped insertion space is formed at a front side of the protruding bar by the cover, the protruding bar, and the housing.

11. A cooking apparatus comprising the heating apparatus of claim 1.

\* \* \* \* \*